US008314511B2

(12) United States Patent
Schuler

(10) Patent No.: US 8,314,511 B2
(45) Date of Patent: Nov. 20, 2012

(54) METHOD AND APPARATUS FOR ALLOCATING ELECTRICITY FROM A DISTRIBUTOR

(76) Inventor: Mike Schuler, West Vancouver (CA)

( * ) Notice: Subject to any disclaimer, the term of this patent is extended or adjusted under 35 U.S.C. 154(b) by 614 days.

(21) Appl. No.: 12/540,296

(22) Filed: Aug. 12, 2009

(65) Prior Publication Data

US 2010/0066170 A1    Mar. 18, 2010

Related U.S. Application Data

(60) Provisional application No. 61/188,642, filed on Aug. 12, 2008.

(51) Int. Cl.
*H02J 3/14* (2006.01)
(52) U.S. Cl. .......................................... 307/31; 307/32
(58) Field of Classification Search ............... 307/31, 307/32
See application file for complete search history.

(56) References Cited

U.S. PATENT DOCUMENTS

| 4,283,635 | A | 8/1981 | Balmer |
| 4,293,915 | A | 10/1981 | Carpenter et al. |
| 4,337,401 | A | 6/1982 | Olson |
| 4,345,162 | A | 8/1982 | Hammer et al. |
| 5,017,799 | A | 5/1991 | Fishman |
| 5,543,667 | A | 8/1996 | Shavit et al. |
| 5,625,236 | A | 4/1997 | Lefebvre et al. |
| 5,770,895 | A | 6/1998 | Kumasaka |
| 5,844,399 | A | 12/1998 | Stuart |
| 6,104,160 | A | 8/2000 | Iwata et al. |
| 6,806,446 | B1 | 10/2004 | Neale |
| 7,256,516 | B2 | 8/2007 | Buchanan et al. |
| 7,274,975 | B2 | 9/2007 | Miller |
| 7,379,997 | B2 | 5/2008 | Ehlers et al. |
| 7,420,293 | B2 | 9/2008 | Donnelly et al. |
| 7,514,815 | B2 | 4/2009 | Paik |
| 7,679,336 | B2 | 3/2010 | Gale et al. |
| 7,711,651 | B2 | 5/2010 | Baraty |
| 7,715,951 | B2 | 5/2010 | Forbes, Jr. et al. |
| 7,830,037 | B2 * | 11/2010 | Hirst ............................. 307/39 |
| 8,013,570 | B2 | 9/2011 | Baxter et al. |
| 2006/0129498 | A1 | 6/2006 | Baraty |

(Continued)

OTHER PUBLICATIONS

PCT ISA-CA: International Search Report and Written Opinion of PCT/CA2010/000147 for "Method and Apparatus for Allocating Electricity From a Distributor" by Mike Schuler.

*Primary Examiner* — Hal Kaplan
(74) *Attorney, Agent, or Firm* — Clark Wilson LLP; Michael J. Roman

(57) ABSTRACT

The present invention provides a method and apparatus for allocating current (20) from a distributor (22), having a maximum rated current, among a plurality of load circuits (24), including a variable load circuit (24$_\alpha$) that benefits from a full load current allocation but is operable at a lower current allocation. The invention provides for measuring the instantaneous current reserve of the distributor (22) as the maximum rated current of the distributor (22) less the instantaneous current flowing from the distributor (22) to the plurality of load circuits (24), and limiting the instantaneous current of the variable load circuit (24$_\alpha$) to the full load current of the variable load circuit (24$_\alpha$) if the instantaneous current reserve is greater than zero, and the sum of the full load current of the variable load circuit (24$_\alpha$) plus the instantaneous current reserve, if the instantaneous current reserve is less than or equal to zero.

60 Claims, 8 Drawing Sheets

U.S. PATENT DOCUMENTS

| | | |
|---|---|---|
| 2007/0110192 A1 | 5/2007 | Steiner |
| 2007/0198133 A1 | 8/2007 | Hirst |
| 2008/0088180 A1 | 4/2008 | Cash et al. |
| 2008/0218121 A1 | 9/2008 | Gale et al. |
| 2008/0231230 A1 | 9/2008 | Gale et al. |

* cited by examiner

*Figure 3A*
*Figure 3B*
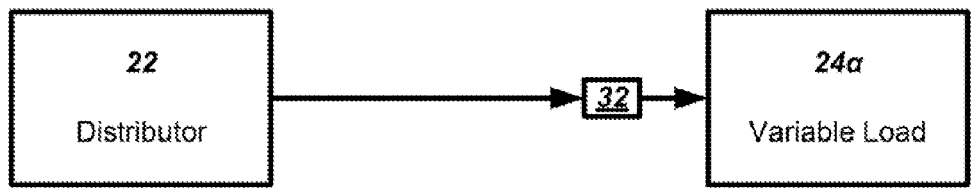
*Figure 3C*
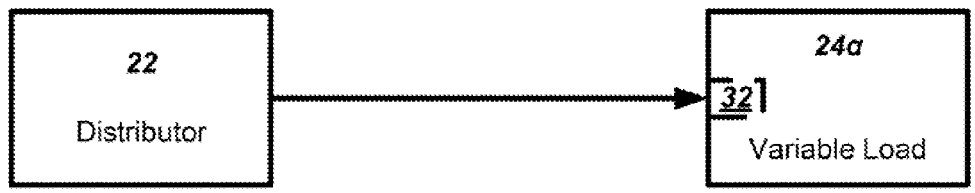
*Figure 3D*
Figure 3

METHOD AND APPARATUS FOR ALLOCATING ELECTRICITY FROM A DISTRIBUTOR

CROSS REFERENCE TO RELATED APPLICATION

This application claims the benefit of priority from U.S. provisional application Ser. No. 61/188,642 filed Aug. 12, 2008 entitled "Increasing the Effectiveness of an Electric Vehicle Battery Charger".

BACKGROUND OF THE INVENTION

1. Field of the Invention

The present invention relates to allocating current from a distributor. More particularly, the present invention relates to allocating current from a distributor having a maximum rated current capacity, among a plurality of load circuits, including a variable load circuit that benefits from a full load current allocation but is operable at a lower current allocation, for example a charging circuit for an electric vehicle battery.

2. Description of the Related Art

Electrical distributors, for example distribution panels, are conventionally designed such that the aggregate current carrying capacity of all branch circuits is significantly higher than that of the main circuit breaker. In other words, the design assumes that not all branch circuits will supply loads—let alone full loads—simultaneously. Each branch breaker is limited to relatively small load capacities, a standard which is derived from statistical analysis of standard consumption patterns. Also worth noting is that the main panel breaker circuit is often characterized by periods of electrical current demand well below its maximum capacity.

When demand for current exceeds the capacity of the distributor, load-shedding is a commonly used method to ensure that the combined loads do not exceed the maximum rated current capacity, typically as established by the main breaker, but more generally established by the lowest capacity component in the main circuit. Through shedding, branch loads are selectively disconnected or disabled when this capacity is approached. This method is used on common branch circuits with fixed or strictly limited variable loads. When the aggregate load of all branch circuits reaches the current capacity rating of the main breaker in the distribution panel, selected loads are switched completely off to reduce the total load on the system. There are no intermediary stages of such load-shedding; either a branch is on or it is off.

This arrangement is sufficient where the contemplated current load on each branch circuit is either fixed or varies within relatively narrow prescribed limits. However, when the current load in a branch circuit is highly variable, and might even rise above the capacity of the main breaker itself, a more flexible, robust and effective solution is necessary and provides the motivation for this invention.

A case in point is opportunity charging for batteries. Batteries can be charged at various rates. When spare capacity exists, there is an opportunity to charge batteries faster. When capacity is limited, charging can be reduced or postponed by shedding a variable amount of the load.

It is common for battery chargers to employ current-control circuitry, but this circuitry is limited to battery-state sensing in order to maximize battery life and prevent damage, not to the sensing of available supply current. By enabling the charger to maximize the charge rate of sensitive batteries, the danger of the battery undergoing excessive deep-discharge cycles is minimized and battery life thereby extended.

As battery-powered electric vehicles become more common, better opportunity charging arrangements will be needed to enable smaller household circuits, with their limited current capacity, to efficiently and effectively recharge vehicle batteries. Such arrangements would make larger charging currents available on demand—when capacity is available—in order to reduce the time it takes to charge a battery bank. As other demands are placed on the distributor, the battery charging load can be partially or completely shed.

Such opportunity charging arrangements would allow the use of a charger branch circuit with much higher current ratings than would normally be available. There are many examples of current sensor technology applied to the measurement, display and shedding of current loads in both household and industrial settings, but none appear to apply the signals thus derived to the variable control of specific current loads in those environments.

SUMMARY OF THE INVENTION AND ADVANTAGES

In a large-scale electric vehicle battery employing 6000 Li-Ion cells where the maximum charge current per cell can be 2.6 A, the peak charge current demand could be as high as 15,600 A at 4V or about 2600 A at 240V. Such demands are unsupportable by typical household main breaker ratings of either 100 A or 200 A. The optimum solution is to provide enabling technology that allows the transfer of any excess current capacity of the main breaker circuit to the battery charger branch circuit. Such an approach allows the installation of a branch circuit with a current carrying capacity of about 80% that of the main breaker circuit. During peak current demand times a current sensor signal would activate restraint of the charging current to some safe value that does not incrementally exceed the rating of the main breaker, while during periods of lower aggregate demand it would allow it to increase to its maximum branch circuit rating.

What is needed is a charging arrangement that can supply a variable load of a much higher current capacity rating than conventional branch circuits. A variable load-shedding arrangement that permits variable current limiting of the high capacity branch circuit for, as the remaining conventional branch circuits draw more or less current as needed. As the current draw varies on the conventional branch circuits, the high capacity variable load circuit varies its current draw to prevent the entire circuit from exceeding the maximum main breaker current, and advantageously, to provide a much higher charging rate as opportunities arise.

This invention effectively makes it possible to design branch circuits with much higher current carrying capacity and to transfer any unused current capacity in the main circuit from them, within their increased current carrying limits. It also provides enabling technology that permits the design of electric vehicle battery chargers that can avail themselves of this arrangement. The current load in the branch circuit may be an electric vehicle battery charger. This invention delivers enabling technology so that the charger is able to control its current demand subject to available current capacity.

According to one aspect of the present invention, there is provided a method of allocating current from a distributor having a maximum rated current among a plurality of load circuits including a variable load circuit that benefits from a full load current allocation but is operable at a lower current allocation, comprising: (a) measuring the instantaneous current reserve of the distributor as the maximum rated current of the distributor less the instantaneous current flowing from the distributor to the plurality of load circuits, (b) limiting the instantaneous current of the variable load circuit to: (i) the full load current of the variable load circuit, if the instantaneous current reserve is greater than zero, and (ii) the sum of the full load current of the variable load circuit plus the instantaneous current reserve, if the instantaneous current reserve is less than or equal to zero.

This method of allocating current from a distributor might be applied to a distribution panel or even a distribution transformer.

In some cases, at least one aspect of measuring and limiting might be performed in an analog manner, for example representing respective currents as respective voltages and comparing or summing the respective voltages.

More particularly, this could be accomplished by representing the maximum rated current of the distributor by setting a reference voltage, representing the instantaneous current flowing from the distributor to the plurality of load circuits by generating an instantaneous voltage signal in response to the instantaneous current, and measuring the instantaneous current reserve of the distributor by summing the reference voltage and the instantaneous voltage signal.

Furthermore, one might represent the full load current of the variable load circuit by setting a second reference voltage, and limit the instantaneous current of the variable load circuit by first comparing the instantaneous current reserve to ground and then, if the instantaneous current reserve is greater than ground, limiting the instantaneous current of the variable load circuit to the full load current of the variable load circuit, and if the instantaneous current reserve is less than ground or equal to, limiting the instantaneous current of the variable load circuit to the sum of the full load current of the variable load circuit plus the instantaneous current reserve.

In some cases, at least one aspect of measuring and limiting might be performed in a digital manner, for example representing the respective currents as binary values and operating upon the binary values.

More particularly, this could be accomplished by representing the maximum rated current of the distributor by setting a memory register, representing the instantaneous current flowing from the distributor to the plurality of load circuits as the output of an analog to digital converter coupled to a current sensor, and measuring the instantaneous current reserve of the distributor by subtracting the instantaneous current flowing from the distributor from the maximum rated current of the distributor.

Furthermore, one might represent the full load current of the variable load circuit by setting a memory register and limit the instantaneous current of the variable load circuit by comparing the instantaneous current reserve to zero, and if the instantaneous current reserve is greater than, limiting the instantaneous current of the variable load circuit to the full load current of the variable load circuit whereas if the instantaneous current reserve is less than or equal to zero, limiting the instantaneous current of the variable load circuit to the sum of the full load current of the variable load circuit plus the instantaneous current reserve.

Limiting might include issuing a limit signal in response to the measured instantaneous current reserve circuit. The limit signal might be issued to a current limiter coupled to the variable load or to a current limiter integrated with the variable load, perhaps wirelessly. The limit signal might be issued to a current limiter at the head of the variable load circuit or to a current limiter integrated with the distributor at the head of the variable load circuit. The limit signal might be pulse-width variable, perhaps in accordance with the SAE J1772 standard.

At least one of measuring and limiting might be responsive to a user-input signal, for example a user-input signal generated remote from the distributor.

At least one of measuring and limiting might be responsive to a safety signal, for example a safety signal that is fedback from the limit signal. The safety signal might be compliant with the SAE J1772 standard.

By extension, limiting the current of the variable load circuit could include limiting the respective currents of a plurality of variable load circuits, for example sharing the instantaneous current reserve such as by sharing an instantaneous reserve current from the distributor. This end might be accomplished through multiplexing the instantaneous reserve current.

Measuring the instantaneous current reserve of the distributor could include measuring the instantaneous current reserve of the distributor as the maximum rated current of the distributor less the instantaneous current flowing from the distributor in the phase corresponding to the phase of the variable load circuit.

In cases where the distributor is configured for at least one of split-phase and multi-phase supply and the variable load circuit is configured as a two-phase load, measuring the instantaneous current reserve of the distributor might include measuring the instantaneous current reserve of the distributor as the maximum rated current of the distributor less the larger of the instantaneous current flowing from the distributor in each of the two phases supplying the variable load.

An apparatus for allocating current from a distributor having a maximum rated current among a plurality of load circuits including a variable load circuit that benefits from a full load current allocation but is operable at a lower current allocation, comprising: (a) means for measuring the instantaneous current reserve of the distributor as the maximum rated current of the distributor less the instantaneous current flowing from the distributor to the plurality of load circuits, (b) means for limiting the instantaneous current of the variable load circuit to: (i) the full load current of the variable load circuit, if the instantaneous current reserve is greater than zero, and (ii) the sum of the full load current of the variable load circuit plus the instantaneous current reserve, if the instantaneous current reserve is less than or equal to zero.

The invention might be applied to various forms of distributor, including for example, a distribution panel and a distribution transformer.

In some cases, at least one aspect of the means for measuring and the means for limiting might function in an analog manner.

More particularly, the means for measuring or the means for limiting might include: respective means for representing the respective currents as respective voltages; and means for comparing or means for summing the respective voltages.

Furthermore, the means for representing the maximum rated current of the distributor could include means for generating a reference voltage; the means for representing the instantaneous current flowing from the distributor to the plurality of load circuits could include means for generating an instantaneous voltage signal in response to the instantaneous current; and the means for measuring the instantaneous current reserve of the distributor could include means for summing the reference voltage and the instantaneous voltage signal.

In this way, the means for representing the full load current of the variable load circuit might include means for generating a second reference voltage and the means for limiting the instantaneous current of the variable load circuit might include means for comparing the instantaneous current reserve to ground, wherein in response, if the instantaneous current reserve is greater than ground, the means for limiting is operable to limit the instantaneous current of the variable load circuit to the full load current of the variable load circuit, and, if the instantaneous current reserve is less than or equal to ground, the means for limiting is operable to limit the instantaneous current of the variable load circuit to the sum of the full load current of the variable load circuit plus the instantaneous current reserve.

In some cases, at least one aspect of the means for measuring and the means for limiting might function in a digital manner.

More particularly, the means for measuring and the means for limiting could include: means for representing the respective currents as binary values and means for operating upon the binary values. Thus, the means for representing the maximum rated current of the distributor could include a memory register; the means for representing the instantaneous current flowing from the distributor to the plurality of load circuits could include an analog to digital converter coupled to a current sensor; and the means for measuring the instantaneous current reserve of the distributor could includes means for subtracting the instantaneous current flowing from the distributor from the maximum rated current of the distributor.

Furthermore, the means for representing the full load current of the variable load circuit could include a second memory register and the means for limiting the instantaneous current of the variable load circuit could include means for comparing the instantaneous current reserve to zero, wherein if the instantaneous current reserve is greater than zero, the means for limiting is operable to limit the instantaneous current of the variable load circuit to the full load current of the variable load circuit whereas if the instantaneous current reserve is less than or equal to zero, the means for limiting is operable to limit the instantaneous current of the variable load circuit to the sum of the full load current of the variable load circuit plus the instantaneous current reserve.

The means for limiting might include means for issuing a limit signal in response to the measured instantaneous current reserve circuit. The means for issuing might include means for issuing the limit signal to a current limiter coupled to the variable load or integrated with the variable load, perhaps wirelessly. The means for limiting might include means for issuing the limit signal to a current limiter at the head of the variable load circuit or a current limiter integrated with the distributor at the head of the variable load circuit.

The means for issuing the limit signal might include a pulse-width modulator, for example a pulse-width modulator that is operable in accordance with the SAE J1772 standard.

At least one of the means for measuring and the means for limiting could be responsive to a user-input signal, including a user-input signal generated remote from the distributor.

Similarly, at least one of the means for measuring and the means for limiting could be responsive to a safety signal, including a safety signal that is fedback from the means for issuing, perhaps as a safety signal in accordance with the SAE J1772 standard.

By extension, the means for limiting the current of the variable load circuit could include means for limiting the respective currents of a plurality of variable load circuits. In this way, the means for limiting the respective currents of a plurality of variable load circuits could include means for sharing the instantaneous current reserve by sharing an instantaneous reserve current from the distributor, perhaps applying means for multiplexing the instantaneous reserve current.

In some cases, the means for measuring the instantaneous current reserve of the distributor might include means for measuring the instantaneous current reserve of the distributor as the maximum rated current of the distributor less the instantaneous current flowing from the distributor in the phase corresponding to the phase of the variable load circuit.

In some cases where the distributor is configured for at least one of split-phase and multi-phase supply and the variable load circuit is configured as a two-phase load, the means for measuring the instantaneous current reserve of the distributor could include means for measuring the instantaneous current reserve of the distributor as the maximum rated current of the distributor less the larger of the instantaneous current flowing from the distributor in each of the two phases supplying the variable load.

One aspect of the invention pertains to an arrangement wherein a current sensor is attached to, connected to or placed in proximity of, a wire or circuit breaker carrying a current to be measured in the main circuit of a distribution panel. The output of the current sensor provides a signal that can be either voltage- or current-based and which varies with the current flowing in the main circuit. This signal may be described as a measured signal.

The measured signal is conditioned to generate a limit signal that provides an electrical load connected to one or more of the branch circuits of distribution panel with a measure of the current available to it at any point in time.

The limit signal can be either a value corresponding to the total electrical current available to the load, or a value corresponding to the incremental electrical current still available, over and above the amount of current being consumed by the load, or a value by which the load's consumption has to be reduced.

One aspect of the invention pertains to the sensor being connected to one phase of the main power circuit when the limit signal applies to a single-phase load or charger.

Another aspect of the invention pertains to a dual current sensor wherein each of two separate current sensors is attached to, connected to or placed in proximity to one phase or one current-carrying section of a distributor in a split-phase main power circuit when the measured signal is destined for a dual-phase load. The dual current sensor provides two separate signals, each behaving as the limit signal for the single-phase case. In the case of multi-phase circuits there may be additional sensors as needed. The measured signals for this arrangement may be combined or individualized into a set of signals or a single limit signal depending on the current load or battery charger requirements.

Another aspect of this invention provides for a signal-wire routing of the sensor or dual sensor either measured or limit signal that can be used by the load, for example a battery charger connected to a battery, to sense total available or incrementally available charging current. This routing can either be a dedicated wire or one of the power line cables. In the latter case signal transport mechanisms such as the household X10 standard may be used, assuming properly filtered electrical noise sources in any of the branch circuits. Alternatively, computer communications standard signaling circuits may be used where the limit signal serves other purposes as well.

Another aspect of this invention provides for an alternate wireless method of transmitting the limit signal or signals from the sensor or the dual sensor to a location suitable for use by the electrical load or charging circuit.

A further aspect of this invention provides an optional current sensor that is attached to, connected to or placed in proximity of, the circuit carrying the current to be measured in the branch circuit that is connected to the electrical load or charger to be controlled. The design, installation and conditioning of this sensor are similar to that of the main circuit current sensor. It may be used by itself to enable generic electric loads to implement consumption safety set points where additional receptacles, perhaps mistakenly, share the same branch circuit. Other safety features are mentioned in the various embodiments.

Another aspect of this invention provides for a current control method and apparatus external to the circuitry of the current load or charger to be controlled. The method would use the limit signal as gate input to power-control equipment such as insulated gate bipolar transistors (IGBT); unmodified chargers would derive their current from this equipment without the need for internal modifications, as opposed to controlling current flow within the low-voltage circuitry inside the charger, which is another aspect.

This invention further provides for the modulation of any of the above limit, conditioned sensor signals with time-of-day parameters. The time-of-day value could either further limit or condition the sensor signals subject to other obligations. This arrangement could also adapt to diurnal fluctuations in the price of electric power.

This invention also includes the concept of modifying any electrical load or charger circuitry to accept measured current sensor data from the main circuit distributor directly with any of the above-mentioned means, so that its circuitry can provide its own implementation of the sensor data signal conditioning or limit signal. In view of current work by the SAE on new standards for electric vehicles, the signal would be conditioned to act as a load-shedding signal similar to that envisioned by electric utilities and would be an input to the EVSE (electric vehicle service equipment) equipment.

The current capacity rating of an electrical power circuit is limited to the lesser of the current carrying capacity of its wires and devices and the rating of the circuit breaker connected to the supply. The arrangement of the present invention increases the degrees of freedom available in the installation of these circuits. For example, wire gauge for 80 A may be installed where a 40 A breaker services the circuit, or a new line is required, but limited to a conservative rating based on normal circuit panel considerations. Sometimes it can also be much more cost-effective to extend an existing heavy-duty circuit to a new location and use sub-panels to service existing equipment on it.

This invention provides a method and apparatus that measures the electrical current flow in one circuit breaker and makes that data available to a load applied to a different circuit breaker within the same distribution panel. It can be applied to indicate the maximum current supply available to an electric vehicle battery charger and enables the charger to adjust its current consumption accordingly. In effect the invention implements a form of electrical load shedding, or more precisely, modulated demand balancing.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 3a-3d are functional block diagrams of the variable load circuit of FIG. 1, showing various couplings for the current limiter.

DETAILED DESCRIPTION OF THE INVENTION

First Embodiment

Figure 1:
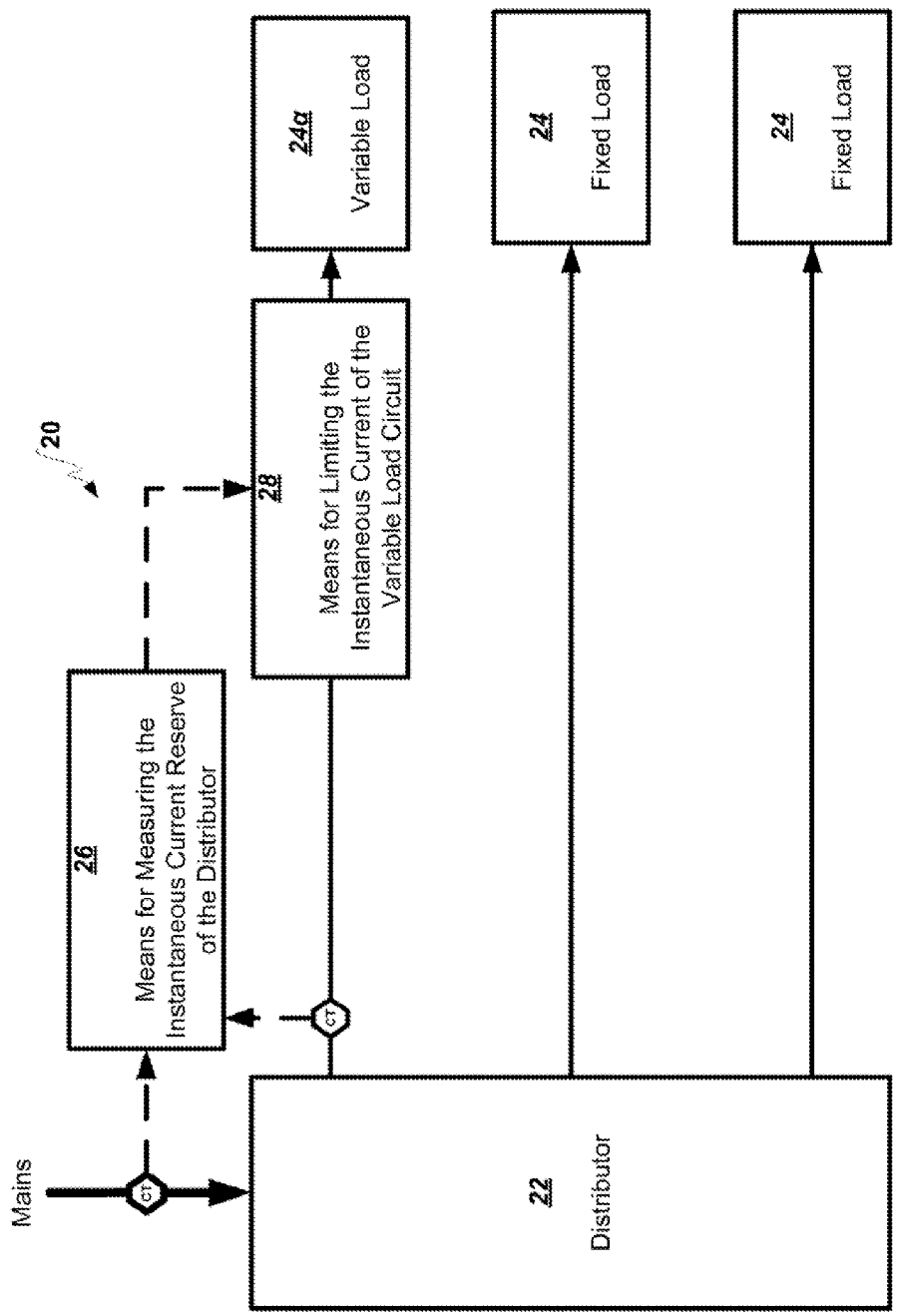
FIG. 1 is a functional block diagram of a first embodiment of the present invention, operable to allocate current from a distributor to a single variable load, and including means for measuring the instantaneous current reserve of the distributor and means for limiting the instantaneous current of the variable load circuit.

Referring to the Figures, wherein like numerals indicate corresponding parts throughout the several views, FIG. 1 shows an apparatus for allocating current 20 from a distributor 22, having a maximum rated current, among a plurality of load circuits 24 including a variable load circuit $24_\alpha$ that benefits from a full load current allocation but is operable at a lower current allocation.

The apparatus 20 includes means for measuring the instantaneous current reserve of the distributor 26 and means for limiting the instantaneous current of the variable load circuit 28 to the full load current of the variable load circuit $24_\alpha$, if the instantaneous current reserve is greater than zero, and the sum of the full load current of the variable load circuit $24_\alpha$ plus the instantaneous current reserve, if the instantaneous current reserve is less than or equal to zero.

In this embodiment, the means for measuring 26 measures the instantaneous current reserve of the distributor 22 as the maximum rated current of the distributor 22 less the instantaneous current flowing from the distributor 22 to the plurality of load circuits 24. Those skilled in the art will recognize that the invention could be applied to measuring and limiting other capacities and combinations of capacities than an illustrated in this specific example.

Figure 2:
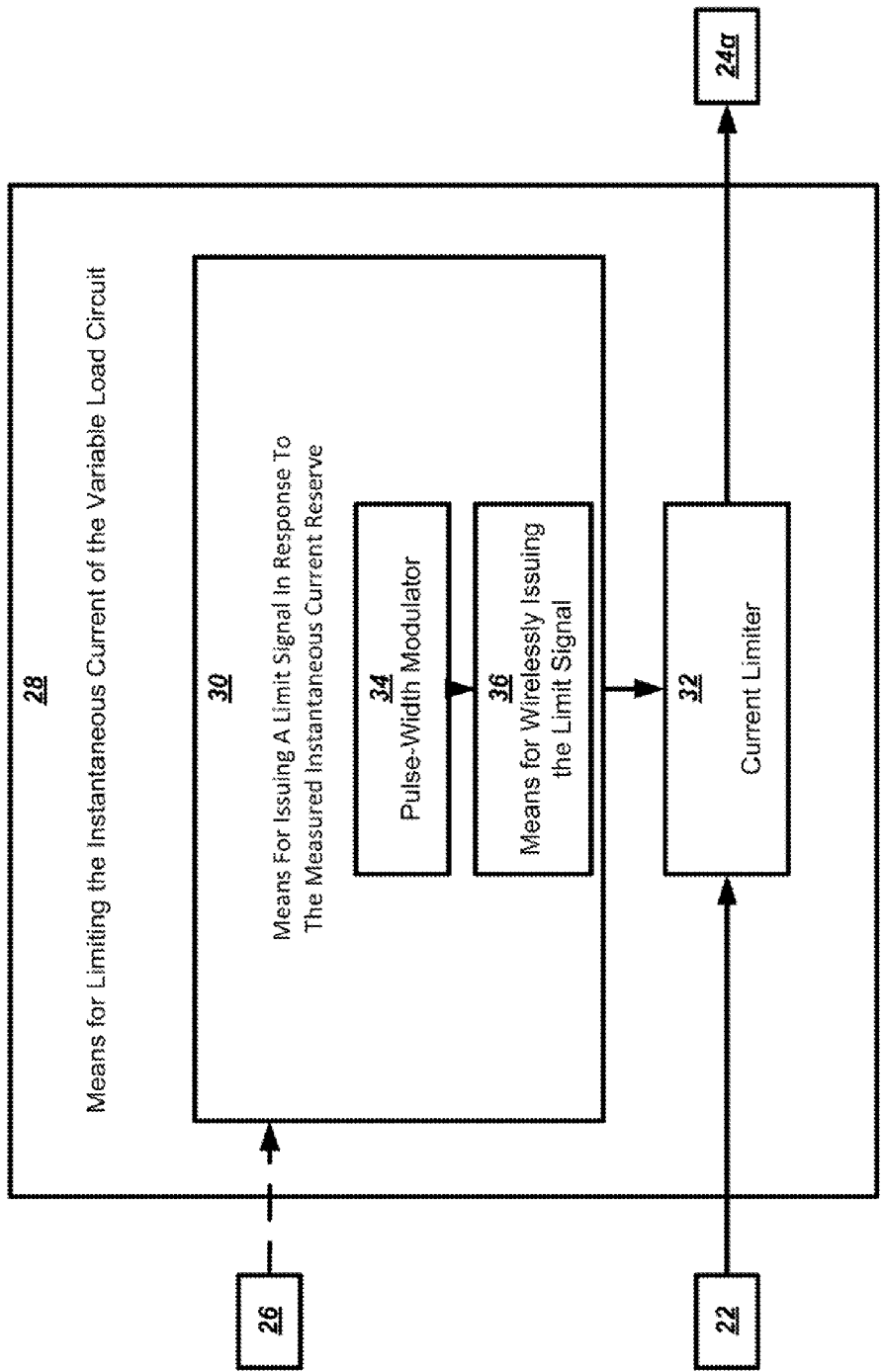
FIG. 2 is a functional block diagram detailing the means for limiting of FIG. 1, including a current limiter.

As detailed in FIG. 2, the means for limiting the instantaneous current of the variable load circuit 28 includes means for issuing 30 a limit signal in response to the measured instantaneous current reserve and a current limiter 32 operable to limit current in the variable load circuit $24_\alpha$ in response to the limit signal.

The means for issuing 30 may include a pulse-width modulator 34, for example one that operates in accordance with the SAE J1772 standard. In the embodiment illustrated, the means for issuing 30 includes means for wirelessly issuing the limit signal 36.

The current limiter 32 might be any device that limits current in response to a signal, for example a power transistor.

Those skilled in the art will recognize that the means for issuing 30 might merely convey the limit signal or might also generate and/or process the limit signal. To this end, the means for issuing 30 might be a simple conductor for conducting a signal representing the measured current reserve, or else it might include processing, coupling and/or transmitting components, such as the pulse-width modulator 34 and the means for wirelessly issuing 36.

Those skilled in the art will also recognize that the means for issuing 30 and the current limiter 32 might be combined.

As shown in FIG. 3, the current limiter 32 may be variously: integrated with the distributor 22 at the head of the variable load circuit $24_\alpha$, located at the head of the variable load circuit $24_\alpha$ discrete from the distributor 22, coupled to the variable load $24_\alpha$ at the tail of the variable load circuit $24_\alpha$, or integrated with the variable load $24_\alpha$.

First Embodiment

Substantially Analog Implementation

Figure 4:
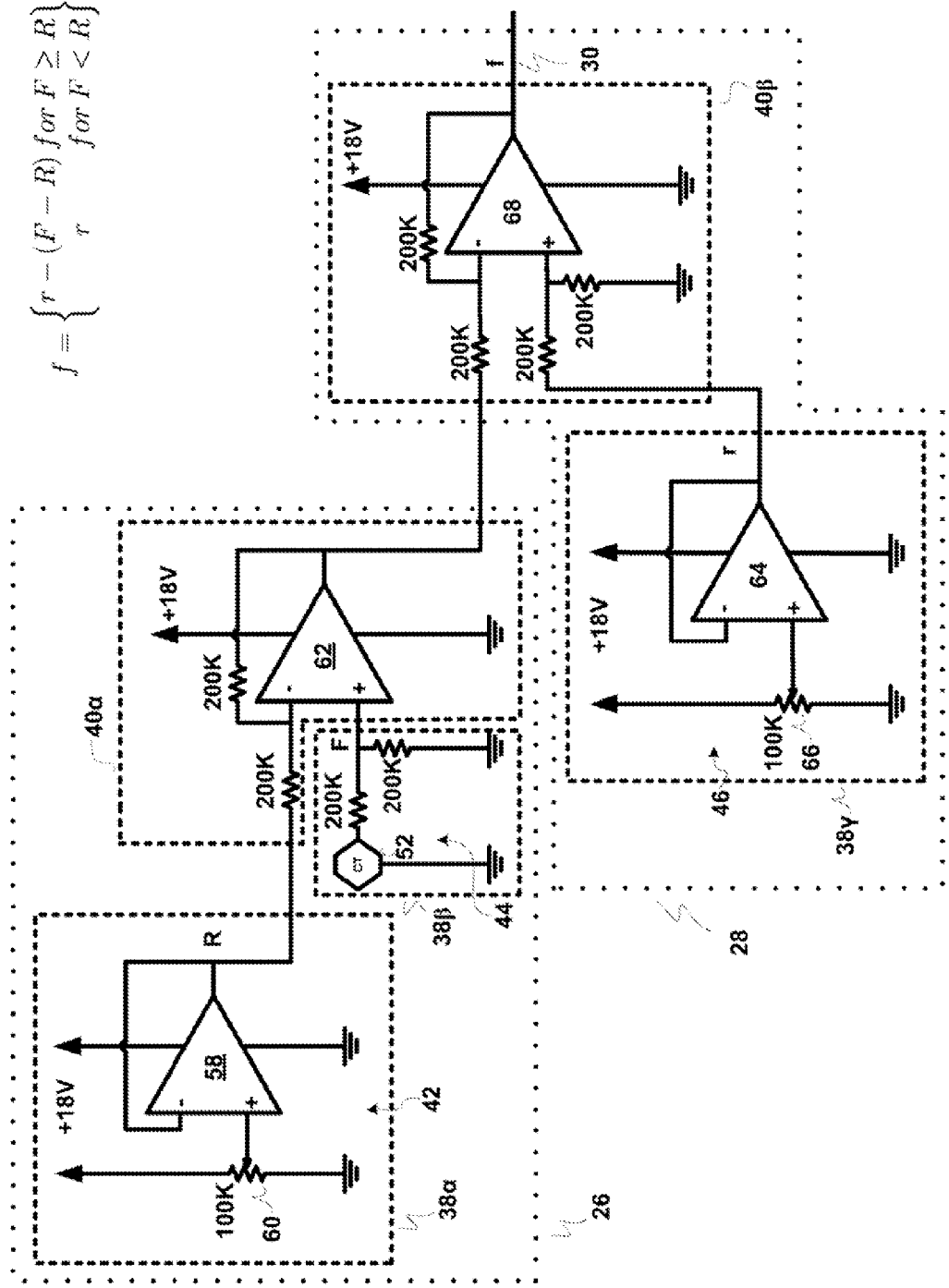
FIG. 4 is a schematic diagram of a substantially analog implementation of the embodiment of FIG. 1.

FIG. 4 shows an implementation of the embodiment of FIG. 1, wherein the means for measuring 26 and the means for limiting 28 function in a substantially analog manner, for example including means for representing the relevant currents as voltages 38 and means for comparing or summing respective voltages 40.

More particularly in this implementation, the means for representing the maximum rated current of the distributor $38_\alpha$ includes means for generating a reference voltage 42, the means for representing the instantaneous current flowing from the distributor to the plurality of load circuits $38_\beta$ includes means for generating an instantaneous voltage signal in response to the instantaneous current 44, and the means for measuring the instantaneous current reserve of the distributor 26 includes means for summing the reference voltage and the instantaneous voltage signal $40_\alpha$.

The means for representing the full load current of the variable load circuit $38_\gamma$ includes means for generating a second reference voltage 46 and the means for limiting the instantaneous current of the variable load circuit 28 includes means for comparing the instantaneous current reserve to ground $40_\beta$, wherein in response, if the instantaneous current reserve is greater than ground, the means for limiting 28 is operable to limit the instantaneous current of the variable load circuit $24_\alpha$ to the full load current of the variable load circuit $24_\alpha$, and if the instantaneous current reserve is less than or equal to ground, the means for limiting 28 is operable to limit the instantaneous current of the variable load circuit $24_\alpha$ to the sum of the full load current of the variable load circuit $24_\alpha$ plus the instantaneous current reserve.

In still greater detail, a current sensor 52, in this implementation a split-core sensor 52, senses the current flowing through the distributor 22 to the plurality of load circuits 24 and in response generates a current that is converted into a representative DC voltage "F" by the means for generating an instantaneous voltage signal in response to the instantaneous current 44, in this implementation a voltage divider.

A first operational amplifier 58 is arranged in a voltage follower configuration as a means for representing the maximum rated current "R" of the distributor 22 as a DC voltage set by a first potentiometer 60.

Both these voltages "F" and "R" are compared in a second operational amplifier 62 to provide a measure of the instantaneous current reserve of the distributor 22 "(F−R)".

A third operational amplifier 64 is also configured as a voltage follower as a means for representing the maximum rated current "r" of the variable load circuit $24_\alpha$ as a DC voltage set by a second potentiometer 66.

Both these voltages "(F−R)" and "r" are compared in a fourth operational amplifier 68 to provide a limit signal "f", which may be defined as:

$$f = \begin{Bmatrix} r - (F - R) & \text{for } F \geq R \\ r & \text{for } F < R \end{Bmatrix}$$

The implementation is effectively calculating maximum permissible current flow "f" to the variable load circuit $24_\alpha$. It does this by clamping the low voltage rail in the operational amplifiers 58, 62, 64, 68 to ground, particularly the second operational amplifier 62. This arrangement prevents the value "(F−R)" from becoming negative. The main current flow through the distributor 22 (represented by "F") includes the branch flow through the variable load circuit $24_\alpha$ (represented by "f"). This implementation provides a limit signal that reacts to the step changes in current flow in the distributor 22.

First Embodiment

Substantially Digital Implementation

Figure 5:
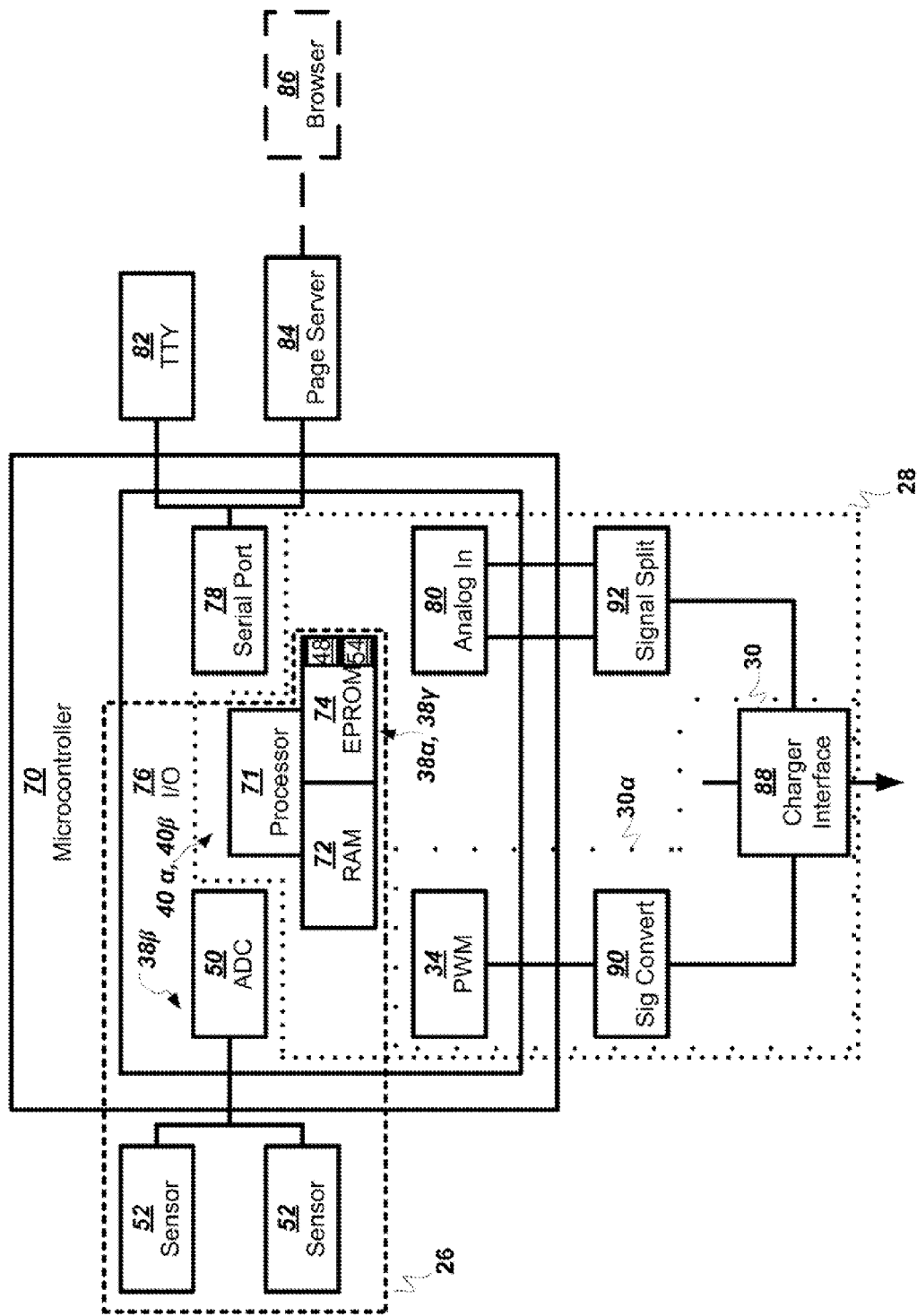
FIG. 5 is a block diagram of a substantially digital implementation of the embodiment of FIG. 1, the implementation including a microcontroller.

FIG. 5 shows an implementation of the embodiment of FIG. 1, wherein the means for measuring 26 and the means for limiting 28 function in a substantially digital manner, for example including means for representing the respective currents as binary values 38 and means for operating upon the binary values 40.

More particularly, in this implementation the means for representing the maximum rated current of the distributor $38_\alpha$ includes a memory register 48 and the means for representing the instantaneous current flowing from the distributor to the plurality of load circuits $38_\beta$ includes an analog to digital converter 50 coupled to one or more current sensors 52.

The means for measuring the instantaneous current reserve of the distributor 26 includes means for subtracting the instantaneous current flowing from the distributor from the maximum rated current of the distributor $40_\alpha$.

The means for representing the full load current of the variable load circuit $38_\gamma$ includes a second memory register 54, and the means for limiting the instantaneous current of the variable load circuit 28 includes means for comparing the instantaneous current reserve to zero $40_\beta$, such that if the instantaneous current reserve is greater than zero, the means for limiting 28 is operable to limit the instantaneous current of the variable load circuit $24_\alpha$ to the full load current of the variable load circuit $24_\alpha$, but if the instantaneous current reserve is less than or equal to zero, the means for limiting 28 is operable to limit the instantaneous current of the variable load circuit $24_\alpha$ to the sum of the full load current of the variable load circuit $24_\alpha$ plus the instantaneous current reserve.

In still greater detail, the apparatus 20 is built around an electronic microcontroller 70 having a processor 71 in communication with a random access memory 72 (RAM 72), an erasable programmable read only memory 74 (EPROM 74), and a plurality of input/output devices 76, including a serial port 78, a plurality of analog read ports 80, the pulse-width modulator 34, and the analog to digital converter 50.

Two current sensors 52 measure each of the two phases in the AC mains supply at the distributor 22 and their output is sent to the analog to digital converter 50 for access by the processor 71.

User communications are enabled via the serial port 78 and either a remote TTY device 82 or a page server 84 in communication with a remote browser 86. This arrangement allows capacity rating values for the distributor 22 and the variable load circuit 24$_\alpha$ to be user-adjusted, a process that normally happens once and where the values are recorded in the registers 48, 54 in the EPROM 74. Thus it will be seen that at least one of the means for measuring 26 and the means for limiting 28 is responsive to a user-input signal, including a user-input signal generated remote from the distributor 22.

The pulse-width modulator 34 generates a unipolar 5V pulse-width modulated waveform whose positive duty cycle is proportional to the amount of current the variable load circuit 24$_\alpha$ may draw, as supplied through a charger interface 88. This duty cycle is calculated under program control subject to the values obtained from the current sensors 52 and the capacity rating stored in the EPROM 74 memory registers 48. This limit signal is sent to the charger interface 88 via a signal converter 90, which converts it into a bipolar +/−12V limit signal. In some implementations, the charger interface 88 is referred to as EVSE (electric vehicle service equipment) according to the SAE J1772 protocol.

This embodiment also implements a safety and control mechanism, wherein the charger interface 88 returns a potentially modified form of the limit signal to a signal splitter 92. The splitter 92 converts the limit signal into two positive pulse-trains so that they can be measured independently by the analog read ports 80 in the microcontroller 70 as positive voltage levels; if these levels fall within pre-programmed limits, battery charging can proceed. Thus it will be seen that at least one of the means for measuring 26 and the means for limiting 28 is responsive to a safety signal, including a safety signal that is fedback from the means for issuing 30, for example a safety signal in accordance with the SAE J1772 standard.

In order to carry out the above actions, the microcontroller 70 is programmed to perform the following actions. First it determines if the capacity rating values have been set and are valid by reading the onboard EPROM 74. Once proper values have been entered and stored, the PWM generator 34 generates a limit signal of arbitrary duty cycle.

The processor 71 then reads the return values delivered by the signal splitter 92 to the analog read ports 80. If the stream corresponding to the negative pulses is less than 12V, the processor 71 simply keeps checking regardless of any other conditions. If the positive pulse is about 12V, again the processor 71 simply keeps checking regardless of any other conditions. Once the positive stream drops to at most 9V, the processor 71 tests the inputs of the current sensors 52 and makes the limit signal active by setting its duty cycle accordingly, while continuing to check for changes in the value of the return streams as above.

If the positive return stream is between 3V and 6V, the processor 71 may also engages a primary relay [not shown] in the charger interface 88 that serves to indicate to the EVSE that charging current may flow. If the positive stream returns to 12V, the relay [not shown] is disengaged and the limit signal returns to its nominal testing value.

While the limit signal is active, the processor 71 accepts no remote user input through the TTY device 82 or the page server 84; however, a user may set or modify the values of the capacity ratings locally; i.e. it is necessary for a user to demonstrate that he is actually at the equipment site, not somewhere remote, for example by throwing a mechanical switch on the hardware board.

The calculations carried out by the microcontroller 70 while the limit signal is active are basically the same as those done in analog form in the embodiment of FIG. 4. However in this alternate embodiment there are two current sensors 52 (one per phase) so that the equivalent single reading used for calculations here is the voltage delivered by the higher of the two. In this way, the means for measuring the instantaneous current reserve of the distributor 26 includes means for measuring the instantaneous current reserve of the distributor 26 as the maximum rated current of the distributor 22 less the instantaneous current flowing from the distributor 22 in the phase corresponding to the phase of the variable load circuit 24$_\alpha$. Similarly, where the distributor 22 is configured for at least one of split-phase and multi-phase supply and the variable load circuit 24$_\alpha$ is configured as a two-phase load, the means for measuring the instantaneous current reserve of the distributor 26 could include means for measuring the instantaneous current reserve of the distributor 26 as the maximum rated current of the distributor 22 less the larger of the instantaneous current flowing from the distributor 22 in each of the two phases supplying the variable load 24$_\alpha$.

In detail, call the maximal phase current flowing in the distributor 22 "I" and let its capacity rating be "R". Calculate "R−I" and add that value to the current "ib" flowing in the variable load circuit 24$_\alpha$, which has a capacity rating of "r". If "(r−ib)" is negative, then that value is added to "ib" and the limited current is set to this new value of "ib".

Safety standards for such EV charger circuits call for dedicated wiring. In situations where special measures are desired to override these standards with non-dedicated circuits, an additional current sensor 52 (not shown) could be added to the charger circuit itself. Its reading when converted to current units would then be an accurate measure of the actual current flowing in that circuit and it is this value that would be used in processor 71 calculations. Specifically, at each iteration the allowed charger current as calculated above is adjusted by the difference between its prior value and the actual current flow "ib", since "ib" now may include extraneous current flows.

Second Embodiment

Figure 6:
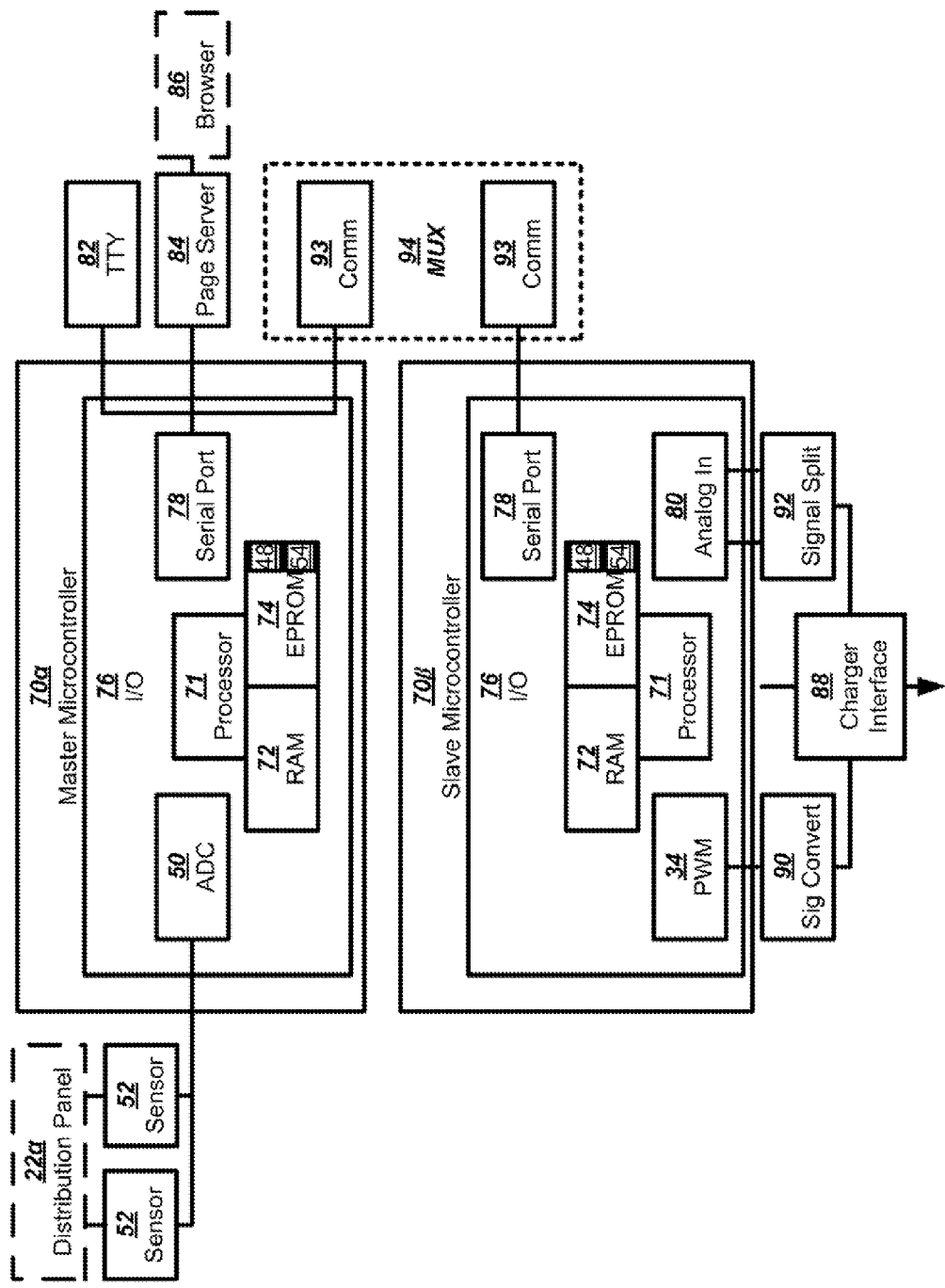
FIG. 6 is a block diagram of a second embodiment of the present invention, illustrating a master-slave configuration adapted for allocating current from a distribution panel to a plurality of variable loads.

FIG. 6 shows a second embodiment of the apparatus 20, which may be viewed as an extension of the implementation of the first embodiment implementation shown in FIG. 5. In general, the second embodiment of the apparatus 20 introduces certain cost saving measures when multiple variable loads 24$_\alpha$ are connected to the same distributor 22, in this case a distribution panel 22$_\alpha$.

The apparatus 20 includes both a master microcontroller module 70$_\alpha$ and a slave microcontroller module 70$_\beta$. The slave module 70$_\beta$ is similar to the basic elements of the first embodiment, but without user interface components. There is one such slave module 70$_\beta$ for each variable load circuit 24$_\alpha$ such that there exists means for limiting 28 the respective currents of a plurality of variable load circuits 24$_\alpha$.

Since the most expensive components of the first embodiment are the current sensors 52, in order to reduce their aggregate cost, only the master microcontroller module 70$_\alpha$ is configured with them in the second embodiment and the slave microcontroller modules 70$_\beta$ have none. The second most expensive component in the first embodiment is the page server 84, which in the second embodiment is again only required by the master microcontroller 70$_\alpha$. The page server 84 is modified to allow user settings of capacity rating for each of the variable load circuits 24$_\alpha$ individually, as well as for the distributor 22 as a whole.

The master module 70$_\alpha$ and each of the slave modules 70$_\beta$ each include a communications unit 93 for communicating among themselves and which in aggregate form a multiplexer 94, in this embodiment a wireless one, so as to provide means for sharing the instantaneous current reserve—in other words an instantaneous reserve current from the distributor 22—in this case by multiplexing the instantaneous reserve current.

Some of the functions of the master module 70$_\alpha$ are to read current levels from the sensors 52, to ensure that all user capacity settings are accounted for and are valid, to receive data from the microcontroller modules 70 and to monitor active slave modules 70$_\beta$. The master module 70$_\alpha$ informs each slave module 70$_\beta$ about the value "r" of its capacity rating and calculates the applicable current values for each slave module 70$_\beta$ and informs the respective slave module 70$_\beta$. In detail for "N" active variable load circuits 24$_\alpha$, call the current flowing in the distributor 22 "I" and let its capacity rating be "R". Instruct each respective active slave module 70$_\beta$ that $$"F = \frac{(R-I)}{N}".$$

The slave modules 70$_\beta$ do not process user settings, as was the case in the first embodiment, but instead use the current readings supplied by the master module 70$_\alpha$. In detail, each respective slave module 70$_\beta$ receives the above calculated value $$"F = \frac{(R-I)}{N}"$$

and add it to the respective current "ib" flowing in its respective variable load circuit 24$_\alpha$ that has a rating "r". If the value "(r–ib)" is negative, then it is added to "ib" and the limited current is set to this new value of "ib".

This second embodiment also takes care of the unlikely situation that chargers are connected to variable load circuits 24$_\alpha$ of different ratings. The wireless multiplexer can be replaced with a hard-wired multiplexer chip that uses the SPI port-select capabilities of the microcontroller 70, where wiring distances and topologies allow.

Third Embodiment

Figure 7:
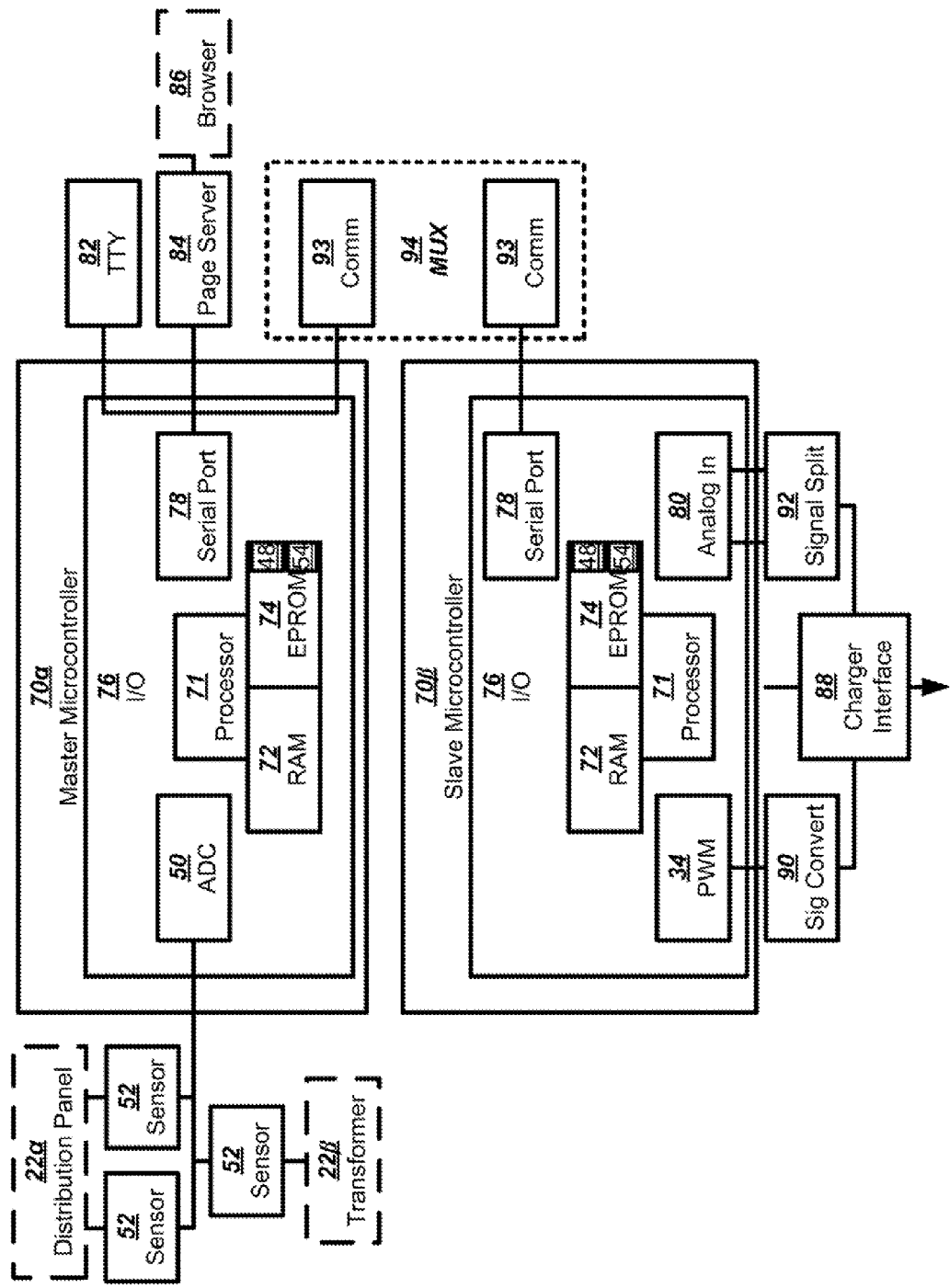
FIG. 7 is a block diagram of a third embodiment of the present invention, illustrating a master-slave configuration adapted for allocating current from a distribution panel to a plurality of variable loads subject to the condition of a distribution transformer feeding the distribution panel.

FIG. 7 shows a third embodiment of the apparatus 20, which may be seen as extending concepts of the second embodiment to include current sensing using a sensor 52 applied to a distributor 22 in the form of a distribution transformer 22$_\beta$ servicing a distribution panel 22$_\alpha$ which supplies load circuits 24, including at least one variable load circuit 24$_\alpha$. Although these transformers 22$_\beta$ already include fault protection, the reason for this sensor 52 is improved safety and allocation: distribution transformers 22$_\beta$ typically have a rating which is less than the aggregate rating of the distribution panels 22$_\alpha$ that they supply.

The third embodiment of the apparatus 20 again comprises a master microcontroller module 70$_\alpha$ and one or more slave microcontroller modules 70$_\beta$. The function of the master module 70$_\alpha$ is to carry out all the current sensing and to inform the slave modules 70$_\beta$ of its calculations. The programming of this unit is therefore almost identical to that described in the second embodiment, except that it only differs in the calculations it performs. In detail, for "N" active variable load circuits 24$_\alpha$, call the current flowing in the transformer 22$_\beta$ "IX" and let its capacity rating be "RX". Call the current flowing in the distribution panel 22$_\alpha$ "I" and let its capacity rating be "R". Then, add "(RX–IX)" to the distribution panel 22$_\alpha$ flow "I" and instruct the slave modules 70$_\beta$ that $$"F = \frac{(R-I)}{N}".$$

The slave modules 70$_\beta$ then operate substantially as in the second embodiment.

Fourth Embodiment

Figure 8:
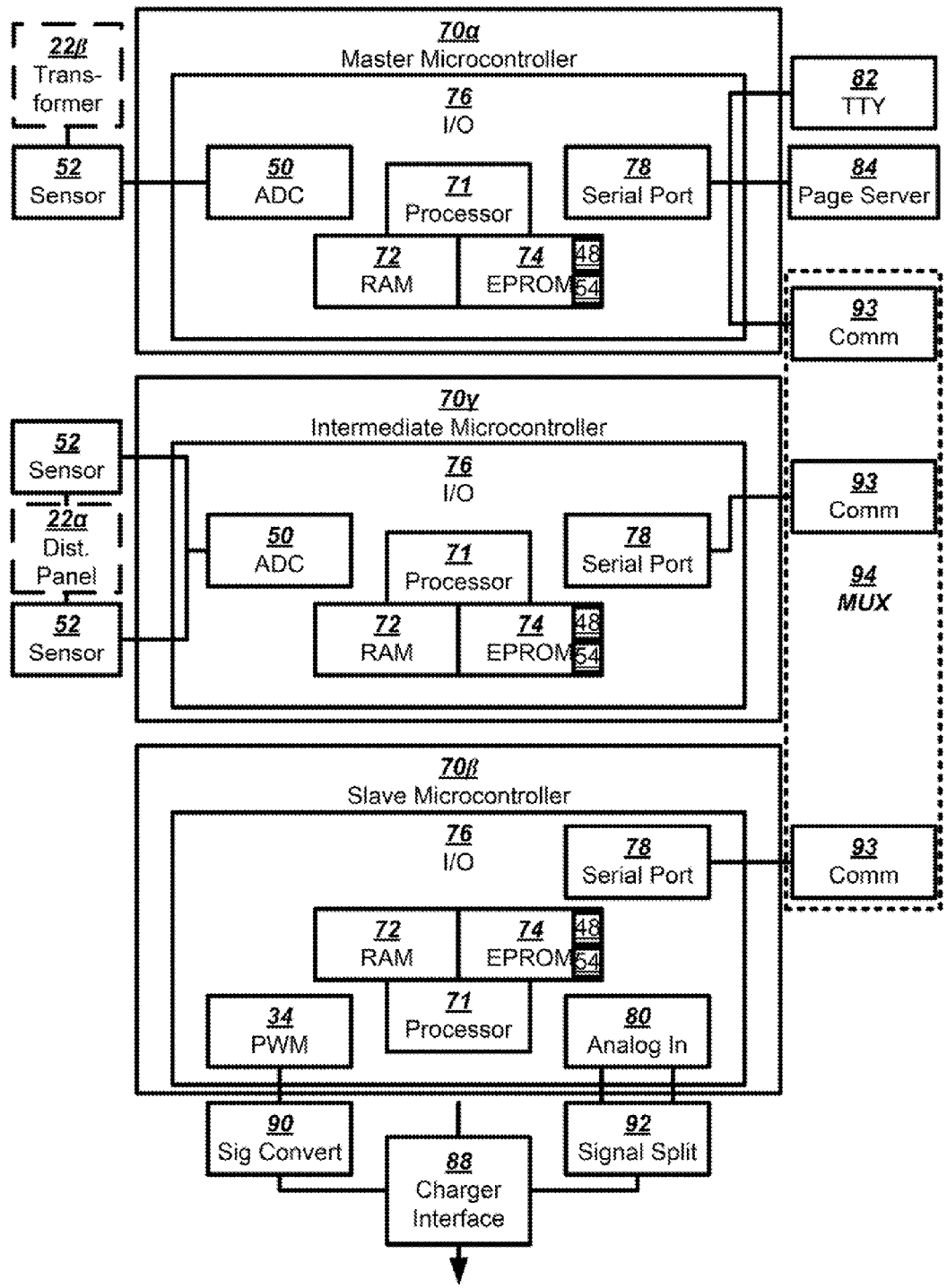
FIG. 8 is a block diagram of a fourth embodiment of the present invention, illustrating a master-slave configuration adapted for allocating current from a plurality of distribution panels to a plurality of variable loads subject to the condition of a distribution transformer feeding the distribution panels.

FIG. 8 shows a fourth embodiment of the apparatus 20, which may be seen as leveraging common aspects of prior embodiments while extending concepts to include configurations with multiple distributors 22, for example multiple distribution panels 22$_\alpha$, and multiple variable load circuits 24$_\alpha$ serviced by a common distribution transformer 22$_\beta$.

The apparatus 20 comprises a master microcontroller module 70$_\alpha$, at least one intermediate microcontroller module 70$_\gamma$, and at least one slave microcontroller module 70$_\beta$. Each intermediate module 70$_\gamma$ is associated with a respective distribution panel 22$_\alpha$ while each slave module 70$_\beta$ is associated with a respective variable load circuit 24$_\alpha$. A slave module 70$_\beta$ may be substantially similar to the slave modules 70$_\beta$ of the third embodiment. Each of the respective modules 70 has a communication unit 93 through which it may communicate with other modules 70.

The master module 70$_\alpha$ is in communication with a transformer 22$_\beta$ current sensor 52. The function of the master module 70$_\alpha$ is to carry out the current sensing on the distribution transformer 22$_\beta$ using a dual sensor 52 and to inform the intermediate modules 70$_\gamma$ of the instantaneous current readings. It also requires a page server 84 accessible through browser 86 to carry out user settings of circuit parameters for the transformer 22$_\beta$, the distribution panels 22$_\alpha$, and the variable load circuits 24$_\alpha$. The user settings in this embodiment also include a map of communications addresses that reflect the links in the hierarchy. This ensures that communications are maintained only between appropriate pairs of nodes in the network. A portion of this communications map is sent to each intermediate module 70$_\gamma$.

The intermediate modules 70$_\gamma$ carry out distribution panel 22$_\alpha$ current sensing via sensors 52. They use that data together with the instantaneous transformer 22$_\beta$ current communicated to them to calculate the available current for the respective slave modules 70$_\beta$ they are responsible for. Each distribution panel 22$_\alpha$ supplies one or more variable load circuits 24$_\alpha$ and thus each intermediate module 70$_\gamma$ is associated with one or more respective slave modules 70$_\beta$.

It is the responsibility of each respective slave module 70$_\beta$ to notify its respective intermediate module 70$_\gamma$ that it is active so that the intermediate module 70$_\gamma$ can determine of the number of active variable load circuits 24$_\alpha$. Similarly, it is the responsibility of each intermediate module 70$_\gamma$ to pass back its calculated values to the master module 70$_\alpha$. These are bottom-up messages that are serviced periodically. All other messages are top-down. All messages use a header to indicate the message type and a value corresponding to that type in the message body; the messages use a termination character to allow processing variable length messages.

The master module 70$_\alpha$ current computations are as follows. For a total of "N" active variable load circuits 24$_\alpha$, call the transformer 22$_\beta$ current "IX" and let its capacity rating be "RX". Calculate $$\frac{(RX - IX)}{N}$$

as the transformer $22_\beta$ current reserve per active variable load circuit $24_\alpha$. The master module $70_\alpha$ can therefore instruct each intermediate module $70_\gamma$ having "n" respective active variable load circuits $24_\alpha$ that its allocation of the transformer $22_\beta$ current reserve is $$"FX = \frac{(RX - IX)}{N} \times n".$$

In receipt of its respective allocation "FX" from the transformer $22_\beta$, each respective intermediate module $70_\gamma$ calculates its allocation per variable load circuit $24_\alpha$ "F" in terms of the instantaneous current "I" measured passing through the distribution panel $22_\alpha$, the rating capacity "R" of the distribution panel $22_\alpha$ and the number "n" of active variable load circuits $24_\alpha$ being supplied by the distribution panel $22_\alpha$. The intermediate module $70_\gamma$ adds "FX" to "I" and calculates $$"\frac{R - I}{n}"$$

as a value of "F", which is communicated to each slave module $70_\beta$.

Each slave module $70_\beta$ operates substantially similarly to the slave modules $70_\beta$ of the third embodiment.

Virtual Capacity Ratings

In the analog implementation of the first embodiment, remote modification of the circuit capacity ratings is absolutely precluded by the design. Mentioned in the digital implementation of the first embodiment and implicit in the second through fourth embodiments, it is precluded as a safety measure, since it would generally be undesirable to have just anybody with access to a browser 86 modify these values incorrectly.

However, a case based on additional safety reasons can be made that user equipment enrolled in utility-driven demand response programs be able to support remote variable capacity rating. This safety feature is not just local, but could protect the distributed electrical grid when under heavy charger loads 30, 24$_\alpha$.

To this end, the preceding digital implementations and embodiments could be modified with the concept of virtual capacity ratings—for the transformer $22_\beta$, the distribution panel $22_\alpha$, and the variable load circuits $24_\alpha$.

A virtual capacity rating is a concept that allows the remote control of the capacity rating values stored in the registers 48, 54 of a microcontroller 70, as long as the remotely controlled values don't violate the settings introduced using the safety measures mentioned previously. It is another method of modulating the charger load, combining demand control and supply control simultaneously.

This feature depends on each microcontroller 70 having a unique hardware address. A guaranteed method to implement this relies on the use of the page server 84 MAC address. The MAC address can be used directly, or it can be an index into a database that points to the real address, whatever that may be. In the absence of access to the MAC address, a unique address would have to be assigned to each page server 84 and/or microcontroller 70.

Under this arrangement, a responsible authority such as the electric utility can be given access to each unique address to set the virtual capacity rating(s) depending on resource availability or based on policy.

In the unlikely case that the granularity of the unique address does not match the desired granularity of control, the control software and the microcontroller 70 can be modified to provide the desired match. As an example, a remote supervisory virtual capacity rating control command to a particular variable load circuit $24_\alpha$ can be translated by the microcontrollers 70 in a hierarchy and routed within the local network composed of nodes as described in the previous embodiments. Such a demand response message would incorporate not just the MAC address, but also a node identifier.

The handling of virtual capacity ratings is accomplished once again with the use of EPROM 74 memory registers 48. Each microcontroller 70 directly or indirectly addressed with remote commands would be responsible for verifying that virtual capacity ratings do not violate EPROM-recorded real rating values. In addition, the messaging software in prior embodiments would have to support additional messages; some of them would be designed to accumulate the actual current consumption of all chargers in the network at a node that could transmit that value to the utility.

Finally, the page server 84 must also be modified to be receptive to input at all times, particularly during the active pulse-width modulator 34 phase. When activated, virtual capacity ratings would override real capacity ratings in all calculations presented in previous embodiments through.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

There are many possible embodiments for this invention. The operation of these embodiments has been discussed on the basis that standard distribution panels $22_\alpha$ using thermally protected circuits have a slower response time to over-current conditions than the sensors 52 employed in this invention to measure current. Further, over-current protection margins in circuit breakers are very generous and can range to 10-times normal current levels. The first described preferred embodiment senses and responds to over-current steps that are estimated to be at most 40% of the main breaker current rating in a single-phase environment.

Electrical current sensors 52 might be magnetically coupled to the wires feeding circuit breakers, but they could also be electrically connected, or the signal could be derived from a power sensor 52 that provides (directly or indirectly) current flow values, or from any part of the breaker or distribution panel $22_\alpha$ or more generally distributor 22 that provides this data.

What is claimed is:

1. A method of allocating current from a distributor having a maximum rated current among a plurality of load circuits including a variable load circuit that benefits from a full load current allocation but is operable at a lower current allocation, comprising:

(a) measuring the instantaneous current reserve of the distributor as the maximum rated current of the distributor less the instantaneous current flowing from the distributor to the plurality of load circuits; and (b) limiting the instantaneous current of the variable load circuit to:

(i) the full load current of the variable load circuit, if the instantaneous current reserve is greater than zero; and (ii) the sum of the full load current of the variable load circuit plus the instantaneous current reserve, if the instantaneous current reserve is less than or equal to zero.

2. A method as set forth in claim 1, wherein at least one of measuring and limiting includes processing an analog signal.

3. A method as set forth in claim 2, wherein at least one of measuring and limiting includes:
   (a) representing the instantaneous current reserve, the maximum rated current of the distributor, the instantaneous current flowing from the distributor to the plurality of load circuits, and the full load current of the variable load circuit as respective voltages; and
   (b) at least one of
      (i) comparing at least some of the respective voltages; and
      (ii) summing at least some of the respective voltages.

4. A method as set forth in claim 3, wherein:
   (a) representing the maximum rated current of the distributor includes setting a reference voltage;
   (b) representing the instantaneous current flowing from the distributor to the plurality of load circuits includes generating an instantaneous voltage signal in response to the instantaneous current; and
   (c) measuring the instantaneous current reserve of the distributor includes summing the reference voltage and the instantaneous voltage signal.

5. A method as set forth in claim 4, wherein
   (a) representing the full load current of the variable load circuit includes setting a second reference voltage; and
   (b) limiting the instantaneous current of the variable load circuit includes comparing the instantaneous current reserve to zero, and
      (i) if the instantaneous current reserve is greater than zero, limiting the instantaneous current of the variable load circuit to the full load current of the variable load circuit, and
      (ii) if the instantaneous current reserve is less than or equal to zero, limiting the instantaneous current of the variable load circuit to the sum of the full load current of the variable load circuit plus the instantaneous current reserve.

6. A method as set forth in claim 1, wherein at least one of measuring and limiting includes processing a digital signal.

7. A method as set forth in claim 6, wherein at least one of measuring and limiting includes:
   (a) representing the instantaneous current reserve, the maximum rated current of the distributor, the instantaneous current flowing from the distributor, and the full load current of the variable load circuit as binary values; and
   (b) operating upon the binary values.

8. A method as set forth in claim 7, wherein:
   (a) representing the maximum rated current of the distributor includes setting a memory register;
   (b) representing the instantaneous current flowing from the distributor to the plurality of load circuits includes reading the output of an analog to digital converter coupled to a current sensor; and
   (c) measuring the instantaneous current reserve of the distributor includes subtracting the instantaneous current flowing from the distributor from the maximum rated current of the distributor.

9. A method as set forth in claim 8, wherein
   (a) representing the full load current of the variable load circuit includes setting a memory register; and
   (b) limiting the instantaneous current of the variable load circuit includes comparing the instantaneous current reserve to zero, and
      (i) if the instantaneous current reserve is greater than zero, limiting the instantaneous current of the variable load circuit to the full load current of the variable load circuit, and
      (ii) if the instantaneous current reserve is less than or equal to zero, limiting the instantaneous current of the variable load circuit to the sum of the full load current of the variable load circuit plus the instantaneous current reserve.

10. A method as set forth in claim 1, wherein limiting includes issuing a limit signal in response to the measured instantaneous current reserve circuit.

11. A method as set forth in claim 10, wherein limiting includes issuing the limit signal to a current limiter coupled to the variable load.

12. A method as set forth in claim 11, wherein limiting includes issuing the limit signal to a current limiter integrated with the variable load.

13. A method as set forth in claim 11, wherein issuing the limit signal includes issuing the limit signal wirelessly.

14. A method as set forth in claim 10, wherein limiting includes issuing the limit signal to a current limiter at a head of the variable load circuit.

15. A method as set forth in claim 10, wherein limiting includes issuing the limit signal to a current limiter integrated with the distributor at a head of the variable load circuit.

16. A method as set forth in claim 10, wherein the limit signal is modulated.

17. A method as set forth in claim 16, wherein a duty cycle of the limit signal is modulated.

18. A method as set forth in claim 10, wherein limiting the current of the variable load circuit includes limiting the respective currents of a plurality of variable load circuits.

19. A method as set forth in claim 18, wherein limiting the respective currents of a plurality of variable load circuits includes sharing the instantaneous current reserve.

20. A method as set forth in claim 19, wherein sharing the instantaneous current reserve includes sharing an instantaneous reserve current from the distributor.

21. A method as set forth in claim 20, wherein sharing an instantaneous reserve current includes multiplexing the instantaneous reserve current.

22. A method as set forth in claim 1, wherein at least one of measuring and limiting is responsive to a user-input signal.

23. A method as set forth in claim 22, wherein the user-input signal is generated remotely from the distributor.

24. A method as set forth in claim 1, wherein at least one of measuring and limiting is responsive to a safety signal.

25. A method as set forth in claim 24, wherein at least one of measuring and limiting is enabled when the safety signal is within pre-programmed limits.

26. A method as set forth in claim 25, wherein the safety signal is compatible with a connector that is compliant with the SAE J1772 standard.

27. A method as set forth in claim 1, wherein the method of allocating current from a distributor is a method of allocating current from a distribution panel.

28. A method as set forth in claim 1, wherein the method of allocating current from a distributor is a method of allocating current from a distribution transformer.

29. A method as set forth in claim 1, wherein measuring the instantaneous current reserve of the distributor includes measuring the instantaneous current reserve of the distributor as the maximum rated current of the distributor less the instantaneous current flowing from the distributor in a phase corresponding to a phase of the variable load circuit.

30. A method as set forth in claim 1, wherein:
   (a) the distributor is configured for at least one of split-phase and multi-phase supply;
   (b) the variable load circuit is configured as a two-phase load; and
   (c) measuring the instantaneous current reserve of the distributor includes measuring the instantaneous current reserve of the distributor as the maximum rated current of the distributor less the larger of the instantaneous current flowing from the distributor in each of the two phases supplying the variable load.

31. An apparatus for allocating current from a distributor having a maximum rated current among a plurality of load circuits including a variable load circuit that benefits from a full load current allocation but is operable at a lower current allocation, comprising:
   (a) means for measuring the instantaneous current reserve of the distributor as the maximum rated current of the distributor less the instantaneous current flowing from the distributor to the plurality of load circuits; and
   (b) means for limiting the instantaneous current of the variable load circuit to:
      (i) the full load current of the variable load circuit, if the instantaneous current reserve is greater than zero; and
      (ii) the sum of the full load current of the variable load circuit plus the instantaneous current reserve, if the instantaneous current reserve is less than or equal to zero.

32. An apparatus as set forth in claim 31, wherein at least one of the means for measuring and the means for limiting is operable to process an analog signal.

33. An apparatus as set forth in claim 31, wherein at least one of the means for measuring and the means for limiting includes:
   (a) respective means for representing the instantaneous current reserve, the maximum rated current of the distributor, the instantaneous current flowing from the distributor to the plurality of load circuits, and the full load current of the variable load circuit as respective voltages; and
   (b) at least one of
      (i) means for comparing at least some of the respective voltages; and
      (ii) means for summing at least some of the respective voltages.

34. An apparatus as set forth in claim 33, wherein:
   (a) the means for representing the maximum rated current of the distributor includes means for generating a reference voltage;
   (b) the means for representing the instantaneous current flowing from the distributor to the plurality of load circuits includes means for generating an instantaneous voltage signal in response to the instantaneous current; and
   (c) the means for measuring the instantaneous current reserve of the distributor includes means for summing the reference voltage and the instantaneous voltage signal.

35. An apparatus as set forth in claim 34, wherein
   (a) the means for representing the full load current of the variable load circuit includes means for generating a second reference voltage; and
   (b) the means for limiting the instantaneous current of the variable load circuit includes means for comparing the instantaneous current reserve to zero, and wherein in response,
   if the instantaneous current reserve is greater than zero, the means for limiting is operable to limit the instantaneous current of the variable load circuit to the full load current of the variable load circuit, and
   (ii) if the instantaneous current reserve is less than or equal to zero, the means for limiting is operable to limit the instantaneous current of the variable load circuit to the sum of the full load current of the variable load circuit plus the instantaneous current reserve.

36. An apparatus as set forth in claim 31, wherein at least one of the means for measuring and the means for limiting is operable to process a digital signal.

37. An apparatus as set forth in claim 36, wherein at least one of the means for measuring and the means for limiting includes:
   (a) means for representing the instantaneous current reserve, the maximum rated current of the distributor, the instantaneous current flowing from the distributor, and the full load current of the variable load circuit as binary values; and
   (b) means for operating upon the binary values.

38. An apparatus as set forth in claim 37, wherein:
   (a) the means for representing the maximum rated current of the distributor includes a memory register;
   (b) the means for representing the instantaneous current flowing from the distributor to the plurality of load circuits includes an analog to digital converter coupled to a current sensor; and
   (c) the means for measuring the instantaneous current reserve of the distributor includes means for subtracting the instantaneous current flowing from the distributor from the maximum rated current of the distributor.

39. An apparatus as set forth in claim 38, wherein
   (a) the means for representing the full load current of the variable load circuit includes a second memory register; and
   (b) the means for limiting the instantaneous current of the variable load circuit includes means for comparing the instantaneous current reserve to zero, and wherein
   (i) if the instantaneous current reserve is greater than zero, the means for limiting is operable to limit the instantaneous current of the variable load circuit to the full load current of the variable load circuit, and
   (ii) if the instantaneous current reserve is less than or equal to zero, the means for limiting is operable to limit the instantaneous current of the variable load circuit to the sum of the full load current of the variable load circuit plus the instantaneous current reserve.

40. An apparatus as set forth in claim 31, wherein the means for limiting includes means for issuing a limit signal in response to the measured instantaneous current reserve.

41. An apparatus as set forth in claim 40, wherein the means for limiting includes means for issuing the limit signal to a current limiter coupled to the variable load.

42. An apparatus as set forth in claim 41, wherein the means for limiting includes means for issuing the limit signal to a current limiter integrated with the variable load.

43. An apparatus as set forth in claim 41, wherein the means for issuing the limit signal includes means for issuing the limit signal wirelessly.

44. An apparatus as set forth in claim 40, wherein the means for limiting includes means for issuing the limit signal to a current limiter at a head of the variable load circuit.

45. An apparatus as set forth in claim 40, wherein the means for limiting includes means for issuing the limit signal to a current limiter integrated with the distributor at a head of the variable load circuit.

46. An apparatus as set forth in claim 40, wherein the means for issuing the limit signal includes a pulse-width modulator.

47. An apparatus as set forth in claim 46, wherein the pulse-width modulator is operable to modulate a duty cycle of the limit signal.

48. An apparatus as set forth in claim 40, wherein the means for limiting the current of the variable load circuit includes means for limiting the respective currents of a plurality of variable load circuits.

49. An apparatus as set forth in claim 48, wherein the means for limiting the respective currents of a plurality of variable load circuits includes means for sharing the instantaneous current reserve.

50. An apparatus as set forth in claim 49, wherein the means for sharing the instantaneous current reserve includes means for sharing an instantaneous reserve current from the distributor.

51. An apparatus as set forth in claim 50, wherein the means for sharing an instantaneous reserve current includes means for multiplexing the instantaneous reserve current.

52. An apparatus as set forth in claim 31, wherein at least one of the means for measuring and the means for limiting is responsive to a user-input signal.

53. An apparatus as set forth in claim 52, wherein the user-input signal is generated remotely from the distributor.

54. An apparatus as set forth in claim 31, wherein at least one of the means for measuring and the means for limiting is responsive to a safety signal.

55. An apparatus as set forth in claim 54, wherein at least one of the means for measuring and the means for limiting is responsive to a safety signal that is fedback from the means for issuing.

56. An apparatus as set forth in claim 55, wherein the safety signal is compatible with a connector that is compliant with the SAE J1772 standard.

57. An apparatus as set forth in claim 31, wherein the distributor is a distribution panel.

58. An apparatus as set forth in claim 31, wherein the distributor is a distribution transformer.

59. An apparatus as set forth in claim 31, wherein the means for measuring the instantaneous current reserve of the distributor includes means for measuring the instantaneous current reserve of the distributor as the maximum rated current of the distributor less the instantaneous current flowing from the distributor in a phase corresponding to a phase of the variable load circuit.

60. An apparatus as set forth in claim 31, wherein:
 (a) the distributor is configured for at least one of split-phase and multi-phase supply;
 (b) the variable load circuit is configured as a two-phase load; and
 (c) the means for measuring the instantaneous current reserve of the distributor includes means for measuring the instantaneous current reserve of the distributor as the maximum rated current of the distributor less the larger of the instantaneous current flowing from the distributor in each of the two phases supplying the variable load.

* * * * *